United States Patent Office 3,346,575
Patented Oct. 10, 1967

3,346,575
FUNGICIDES AND A PROCESS FOR PRODUCING THEM
Willy Bernheim, Goggingen, near Augsburg, Heinz Enders, Stadtbergen, Augsburg, and Hans Deiner, Neusass-Lohwald, near Augsburg, Germany, assignors to Chemische Fabrik Pfersee, G.m.b.H., Augsburg, Germany, a firm of Germany
No Drawing. Filed July 12, 1965, Ser. No. 471,472
11 Claims. (Cl. 260—249.6)

This invention relates to a process for producing condensation products acting as fungicides and to fungicides produced by such process.

It has been known for a long time to use pentachlorophenol, as a fungicidal finisher, particularly for textiles. However, pentachlorophenol has the drawback of being volatile and also of having high tendency to crystallization. When the treated materials are dried at a higher temperature, volatilization causes a sublimation of pentachlorophenol. On the other hand, tendency to crystallization produces the so-called efflorescence, i.e. the formation of visible large crystals upon the outer surface.

Attempts were made to eliminate these drawbacks by the use of ester of pentachlorophenol with fatty acids. However, these esters are much less effective; furthermore the manufacture and the purification of these esters are very difficult.

It was further suggested to avoid these drawbacks by a combination of free pentachlorophenol with pentachlorophenol-fatty acid esters. Mixtures of this type have certain advantages, but the drawbacks of the difficulty in manufacturing the esters and of the tendency of the free pentachlorophenol to sublimation remain present. Furthermore, the emulsifying capacity of these mixtures depends upon the most precise observation of the mixing ratio so that even when the percentages are slightly changed difficulties arise in the reproduction possibility of the emulsion manufacture.

An object of the present invention is to eliminate the drawback of prior art processes.

Other objects will become apparent in the course of the following specification.

The accomplishment of the objectives of the present invention is based substantially upon the discovery that it is possible to produce in a simple and cheap manner a fungicide having pentachlorophenol as its base but not having the above described drawbacks, by reacting pentachlorophenol with ethers of low monovalent aliphatic alcohols with methylol compounds of urea or its derivatives, possibly in the presence of free low aliphatic alcohol. Instead of the specifically manufactured ethers their starting materials are preferably reacted with pentachlorophenol, such as the methylol compounds and the alcohols, or paraformaldehyde, urea or its derivatives and the alcohols.

Products thus obtained are resin-like masses which are soluble in organic solvents, particularly chlorinated hydrocarbons and in the form of such solutions they can be emulsified in a simple manner. They contain practically no free pentachlorophenol, but in their fungicidal effects they correspond to those of an amount of free pentachlorophenol which is the same as that present in the product of the present invention in the bound form. As compared to known mixtures of pentachlorophenol and pentachlorophenol fatty acid esters, the products of the present invention have a considerably better fungicidal effect and, furthermore, they can be transformed into durable emulsions in an easier manner.

A further important advantage consists in that when the treated material is heated, the products of the present invention change into a form which is not soluble in water and organic solvents. This makes such fungicidal finishes resistant not only against treatment with water, but also against a treatment with organic solvents, this being of particular importance, for example, for such textiles which must be subjected to a chemical cleaning.

In the scope of the invention urea derivatives are defined as polyureas as produced by reacting polyamines with urea, substituted ureas especially cyclic substituted ureas, such as ethylene urea, propylene urea or their derivatives containing hydroxyl groups, such as dioxyethylene urea, oxypropylene urea etc., heat reaction products such as biuret or aminotriazines particularly melamine etc. However, urea derivatives are also suitable which are produced by replacing the oxygen atom by nitric groups, such as dicyandiamide or guanidine, for example.

The manufacture of methylol derivatives of urea or of its above defined derivatives, as well as their etherification products with low aliphatic alcohols, are carried out in accordance with known processes. As low aliphatic alcohols are used such with 1 to 5 C-atoms, particularly 3 to 4 C-atoms.

If the ethers of the methylol derivatives are replaced by their starting materials, namely methylol derivatives along with the low aliphatic alcohols, then an excessive amount of alcohol is used, i.e. an amount which is greater than that required for etherification. This also takes place when the methylol derivatives are replaced by their starting materials, as for example, paraformaldehyde and urea. In such cases the paraformaldehyde as well is preferably introduced in excessive stoichiometric amounts.

The manufacture of the products of the present invention is carried out during heating, whereby the excessive alcohol, or the alcohol which is freed by etherification, is distilled off to a greater or lesser extent. When pure ether of methylol derivatives is used, it is advantageous to add free alcohol, preferably one with 3 to 4 C-atoms to attain a homogeneous mixing of the starting materials. This amount of excessive alcohol is not critical, however, and it can constitute up to 300 mol percent with reference to the amount of alcohol required for etherification, or the amount present in etherified form.

The final temperature of the reaction depends upon the boiling point of the alcohol. Mostly it is between 10° C. to 60° C. higher than the boiling point of the pure alcohol.

The amount of pentachlorophenol in relation to methylol compounds of urea or its above defined derivatives can vary within wide limits. It should be preferably less than 0.5 mol, more particularly less than 0.3 mol per methylol group.

The following examples are given by way of exemplification only.

EXAMPLE 1

360 gr. pentachlorophenol, 270 gr. of a spray-dried dimethylol urea and 800 ml. isobutyl alcohol are heated while stirring and distilling off excessive alcohol to 130° C. and are left at that temperature for 8 minutes. There are then produced about 720 gr. of a resin-like mass which is soluble in organic non-polar solvents, such as benzene, toluene or perchloroethylene. Textiles after being treated with this product, then dried and subsequently heated, have an excellent fungicidal effect which is also resistant against moisture. The product can be applied in the form of a solution in an organic solvent or in the form of an aqueous dispersion.

EXAMPLE 2

266 gr. pentachlorophenol, 200 gr. of a hexamethylol melamine highly etherified by methyl alcohol and 350 ml. butyl alcohol are heated while stirring in a bottle, equipped with a descending condenser to 150° C. and are left at that temperature for 20 minutes. The resin-like mass which is thus produced is soluble practically without limits in toluene or trichloroethylene. Even concentrated solutions do not have any tendency to crystallization after lengthy standing.

EXAMPLE 3

360 gr. pentachlorophenol, 270 gr. dimethylol ethylene urea (about 93%, remainder water) and 700 ml. isobutyl alcohol are heated to 150° C. while distilling off excessive alcohol and are left at that temperature for 30 minutes. The yield is about 700 gr. of a resin-like organically soluble condensation product.

EXAMPLE 4

300 gr. pentachlorophenol, 50 gr. of a polyurea (produced by heating 1 mol diethylene triamine with 2 mols urea to 140° C. up to the splitting off of about 2.2 mol $NH_3$), 100 gr. paraformaldehyde and 600 ml. propyl alcohol are heated for 10 minutes under reflux, then are again heated to 140° C. while distilling off excessive alcohol and are left for 20 minutes at that temperature. This product is also organically soluble and acts as a fungicide upon textiles or other fibrous materials, such as paper or leather.

It is apparent that the examples described above have been given solely by way of illustration and not by way of limitation and that they are subject to many variations and modifications within the scope of the present invention. All such variations and modifications are to be included within the scope of the present invention.

What is claimed is:

1. A process for manufacturing condensation products soluble in organic solvents and acting as fungicides, which comprises reacting while heating an ether of a methylol derivative of a compound selected from the group consisting of urea, polyureas, ethylene urea, propylene urea, and melamine of a monovalent, saturated, aliphatic alcohol having from 1 to 5 carbon atoms with pentachlorophenol until the condsensation products are soluble in non-polar, water immiscible organic solvents.

2. A process for manufacturing condensation products soluble in organic solvents and acting as fungicides, which comprises reacting while heating an ether of a methylol derivative of a compound selected from the group consisting of urea, polyureas, ethylene urea, propylene urea, and melamine of a monovalent, saturated, aliphatic alcohol having from 1 to 5 carbon atoms with 0.1 to 0.5 mol pentachlorophenol per each methylol group until the condensation products are soluble in non-polar, water immiscible organic solvents.

3. A process in accordance with claim 1 wherein said ether is produced during the reaction by reacting a monovalent, saturated, aliphatic alcohol having from 1 to 5 carbon atoms with a methylol derivative of a compound selected from the group consisting of urea, polyureas, ethylene urea, propylene urea and melamine.

4. A process in accordance with claim 1, wherein said ether is produced during the reaction by reacting a monovalent, saturated, aliphatic alcohol with paraformaldehyde and a compound selected from the group consisting of urea, polyureas, ethylene urea, propylene urea, and melamine.

5. A process in accordance with claim 1, wherein said reaction is carried out in presence of an excess of said monovalent, saturated, aliphatic alcohol.

6. A product obtained in accordance with claim 2.

7. The process in accordance with claim 2, wherein heating is continued to a final temperature which is above the boiling point of said alcohol.

8. The process in accordance with claim 2, wherein heating is continued to a final temperature which is 10° C. to 60° C. higher than the boiling point of said alcohol.

9. The process in accordance with claim 2, wherein said compound is urea.

10. The process in accordance with claim 2, wherein said compound is melamine.

11. The process in accordance with claim 2, wherein said compound is ethylene urea.

No references cited.

HENRY R. JILES, *Primary Examiner.*